Feb. 23, 1926.  
F. L. O. WADSWORTH  
1,574,214  
SHOCK ABSORBING DEVICE FOR VEHICLES  
Filed June 8, 1922  
4 Sheets-Sheet 2

INVENTOR  
F. L. O. Wadsworth Feb. 23, 1926.   1,574,214
F. L. O. WADSWORTH
SHOCK ABSORBING DEVICE FOR VEHICLES
Filed June 8, 1922   4 Sheets-Sheet 3

INVENTOR
F. L. O. Wadsworth

Feb. 23, 1926.  1,574,214
F. L. O. WADSWORTH
SHOCK ABSORBING DEVICE FOR VEHICLES
Filed June 8, 1922  4 Sheets-Sheet 4

INVENTOR
F. L. O. Wadsworth

Patented Feb. 23, 1926.

1,574,214

UNITED STATES PATENT OFFICE.

FRANK L. O. WADSWORTH, OF PITTSBURGH, PENNSYLVANIA.

SHOCK-ABSORBING DEVICE FOR VEHICLES.

Application filed June 8, 1922. Serial No. 566,911.

*To all whom it may concern:*

Be it known that I, FRANK L. O. WADSWORTH, a citizen of the United States, residing at Pittsburgh, Pennsylvania, have invented a new and useful Improvement in Shock-Absorbing Devices for Vehicles, of which the following is a full, clear, and exact description, such as will enable others skilled in the art to which it appertains to make and use the same.

My invention relates to that class of shock absorbing devices for vehicles which cushion and elastically absorb not only the effects of kinetic compression movement, but also the effects of any rebound, or of any abnormal separation of the body and axle members, that may result from the passage of the wheels over the irregularities of the road surface. This class of apparatus is generically distinguished from that which acts in one direction only—e. g., to soften or cushion compression shocks—by a much smoother and easier operation of the elastic suspension system, and more particularly by the elimination, or substantial abatement, of the objectionable tossing and pitching of the vehicle body that results from an unrestrained recoil of the suspension springs after severe compression.

One of the primary objects of this invention is to produce a double or dual restraint system of the functional character just indicated, which will operate effectively under widely varying conditions of loading; and which can be readily adjusted or modified so as to impose any required degree of relative restraint or cushioning effect on the opposed movements of the body and axle parts toward and away from each other. In the present invention I accomplish this object by the utilization of a combination of supplemental springs, one of which is primarily designed and adapted to directly resist the compression of the resilient support system; and another of which is directly effective in restraining the rebound or separation of the spring supported members, and is also indirectly effective in controlling or governing compressive movements. Any desired ratio between the reverse, or counter, actions of the supplemental spring system—in respectively resisting oscillatory movements of the body and axle members toward or away from each other—can then be obtained by a suitable proportioning and arrangement of the different secondary elements of the combination; in such manner, for example, as is exemplified in the various illustrative embodiments of my invention hereinafter described.

Another object of the present improvements is to provide a spring suspension system in which the supplemental resilient elements are so arranged as to effectively resist and restrain any lateral displacement—such as side sway, or rolling, or longitudinal pitching—of the vehicle tonneau on its running gear supports; and thus increase the steadiness of body movement and the ease and safety of driving.

A further object of this invention is to provide a supplemental spring unit, which is simple and self contained in structure, and which can be interposed directly between an end of a main spring support and that part of the vehicle to which said end is ordinarily pinned or shackled, without any change in the construction or relative arrangement of the standard chassis parts of the vehicle.

Other objects and advantages of various applications of my improved shock absorber constructions will become apparent from a more detailed consideration of the several exemplary embodiments of the present invention hereinafter described. These are illustrated in the accompanying drawings in which:

(Figs. 21 and 23)

In the construction shown in Figs. 1 to 5, the eye ends of the cross leaf spring 1 are pivotally coupled to the outer extremities of twin arm levers 2—2, and the latter are supported on the axle brackets 3—3 by means of the twin shackle links 4—4. The inner ends of each twin lever member, 2, are elastically coupled to the axle of the vehicle by means of a pair of tension springs 5—5; and the intermediate portion of the said member is also resiliently connected to the body of the vehicle by means of cross bolts 6 and 8 and a single tension spring 9. The bolts 6 and 8 are so positioned that when the parts are in normal load position (Fig. 1) the axis of the spring 9 is in substantial alignment with the shackle pivot support for the lever 2 and does not therefore exert any angular pull on the latter member. Under such conditions the normal load pressure on the outer end of each lever element is carried entirely by the initial tension in the supplemental springs 5—5.

Figures 1, 2:
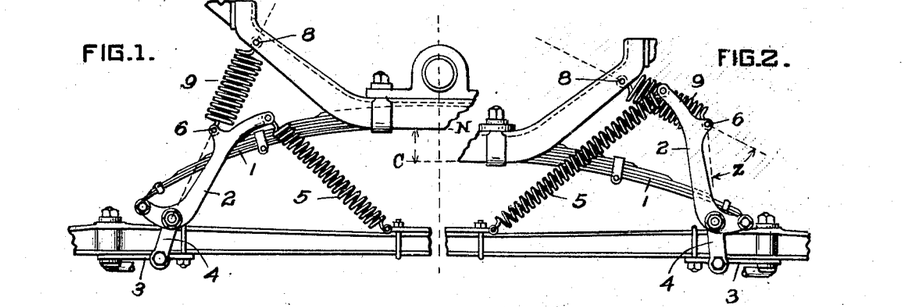
Fig. 1 is a front elevation of one side of a cross-leaf spring support that is provided with one form of my improved shock absorber device.
Fig. 2 is a similar view of the same combination on the opposite side of the vehicle and shows the parts in the position of compression.
Figures 3, 4, 5:
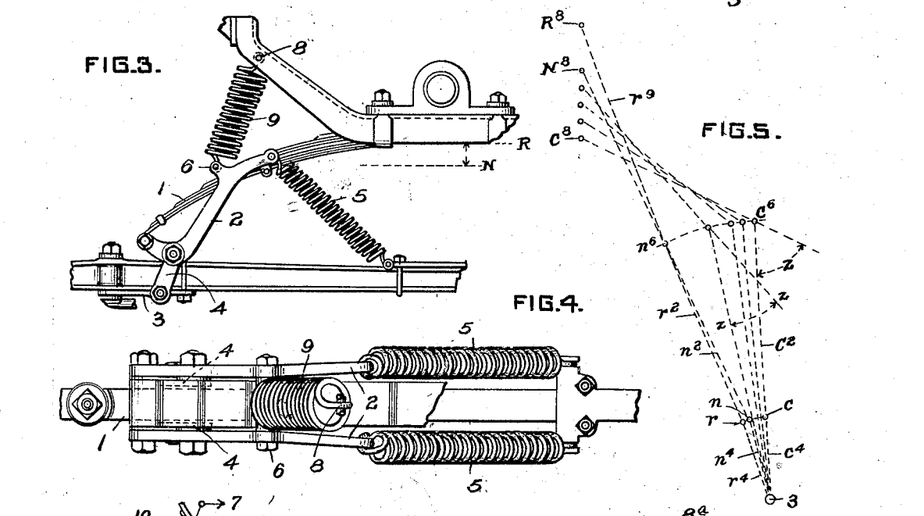
Fig. 3 is another view of the construction shown in Fig. 1, with the members thereof in the position of extreme rebound.
Fig. 4 is a plan view (on a large scale) of this same construction.
Fig. 5 is a diagram showing the relative positions of the ends of the rebound restraint spring at different points in the normal oscillatory movement of the body and axle members.

When the system is subjected to an increased kinetic load stress, or compressive shock, the levers 2—2 are rocked outwardly from the position shown in Fig. 1 toward that shown in Fig. 2. This imposes an increased tension on the supplemental springs 5—5 which therefore tend to cushion the compressive movement and resist the approach of the body and axle parts. The relation between the linear approach of the body and axle members and the angular movement of the levers, 2—2, depends on the relative flexural resistances of the main spring and the supplemental springs, 5—5, and on the ratio between the short and long arms of the lever elements, with which these two elastic units are respectively connected. These operating parts are preferably so proportioned, that during the normal compressive movement (N to C) the distance between the bolt connections 6 and 8 is not substantially changed (see diagram of Fig. 5); and this movement does not, under these conditions, sensibly alter the initial tension of the auxiliary springs 9, 9. The movement does however change the position of these springs with respect to the levers 2; and the latter are thereby subjected to progressively increased and oppositely directed stresses, each of which is equal to the initial tension of the resilient element 9 multiplied by the sine of the angle, $z$, between the axis of the said spring and the lever arm 2—6 (or $c^2$—$c^6$). The compression of the system therefore, concurrently increases the inward pull of both sets of springs, 5—5, and, 9—9, on the outwardly moving elements 2—2; and also progressively increases the reactive outward pressure on the opposed body connections, 8—8. Any lateral displacement of these connections, away from the vertical lines of movement $N^8$—$C^8$, or any departure of the lever movements from the predesigned action depicted in Fig. 5,—which may change, or tend to change, the normal load length and the initial flexure of the springs, 9—will thus be controlled and restrained to a greater and greater degree as the compression movement continues. The combined effect of the concurrent linear and angular motions of the parts, 8, 1, 2, 6 and 9, is to exercise a continually augmented control on the compression movements which will prevent, or tend to prevent, any unsymmetrical or dissimilar action of the two sides of the elastic suspension system, or any rocking or sidewise displacement of the body assemblage on its running gear supports. The approach of the body and axle parts is therefore resisted and concurrently governed, or guided by the joint and cooperative action of both sets of springs 5—5 and 9, 9; but only the first set of supplemental resilient elements is normally subjected to increased flexure as the compression movement increases.

When the system shown in Figs. 1 to 5 is subjected to rebound stress, the separation of the body and axle parts beyond the position of static equilibrium (or normal load N) is directly resisted by the tension of the auxiliary springs 9, 9, which are elongated by an amount that is substantially equal to the rebound movement N—R. During this movement the angular position of the levers 2—2 will be only slightly altered from that shown in Fig. 1 and the normal tension in the springs 5, 5, will therefore remain substantially unchanged. The lever supports for the ends of the main spring 1 are however free to adapt themselves to the natural movement of this primary suspension member, when it is temporarily relieved of strain by the rebound or relative upthrow of the vehicle body; and this movement can therefore take place without imposing any great degree of reverse flexure or abnormal "camber" on the said main spring.

It will be noted that the lever and supplemental spring elements, 2—5—9, are so disposed with relation to the body of the vehicle, that the latter is always subjected—during both compression and rebound movements—to two pair of oppositely and symmetrically inclined forces which resist any lateral rocking or rolling movement and act to hold the spring suspended parts in "centered" position on the running gear members. Any transverse displacement—in the plane of the main spring suspension—is also resisted by the upward movement of the main shackle links 4 on the side which is tending to move away from the center, with a resultant lifting of that side against the action of gravity. The combined effect of these "centering" actions is to efficiently restrain and quickly abate the objectionable and dangerous "side sway" that is induced by the rapid passage of the vehicle wheels over laterally uneven or irregular road surfaces, or by turning corners at a high speed. This feature of my present invention is therefore of importance in increasing the safety, as well as the comfort, of driving motor cars; and it is also conducive to the reduction of the lateral strain and distortion of the parts of the chassis frame.

Figure 6:
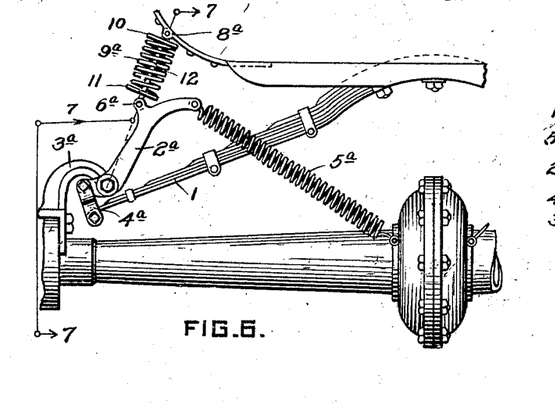
Fig. 6 is an elevation of a second embodiment of my invention as applied to the cross-leaf spring mounting for the rear axle of a Ford car.
Figure 7:
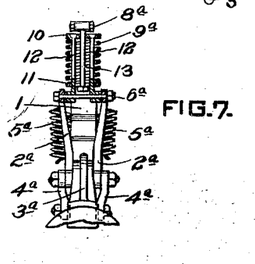
Fig. 7 is an end view on the plane 7—7—7 of Fig. 6.

The organization shown in Figs. 6 and 7 is substantially the same in general structure as that illustrated in Figs. 1 to 5, save that the rebound-restraint spring is an open coil compression spring instead of a closed coil tension spring. In this arrangement the secondary resilient member $9^a$ is confined, at the desired initial or normal tension, between two heads 10 and 11, the first of which is connected to the cross bolt $6^a$ by the two pivot bolts 12—12, and the second of which is coupled to the pin $8^a$ by the single adjustable bolt 13 (see Fig. 7). The operation of this device is essentially the same as that of the first described construction: When subjected to a compressive stress the lever arms $2^a$ are rocked outwardly and the tension springs $5^a$—$5^a$, are subjected to increased flexure, but the spring $9^a$ remains substantially unchanged in length, and cooperates with the springs $5^a$—$5^a$ (in resisting unsymmetrical movements or lateral distortions of the system during the approach of the body and axle parts) only by reason of its change in angular position with respect to the lever element. When subjected to rebound or expansion stress, the lever arms are not sensibly moved from normal or static load position, but the spring $9^a$ is subjected to a direct compression stress that is proportional to the separation of the axle bracket $3^a$ (which carries the parts $2^a$—$6^a$) and the body bracket that supports the pin $8^a$ (and its attached follower plate 11). In the complete organization each end of the main spring 1 is supported in the manner shown in Figs. 6 and 7; and the body of the vehicle is at all times maintained in centered position on its axle and running gear supports by the symmetrically and obliquely inclined actions of the twin pair of lever and spring elements ($2^a$—$5^a$—$9^a$) on the opposite sides of the chassis frame.

Figure 8:
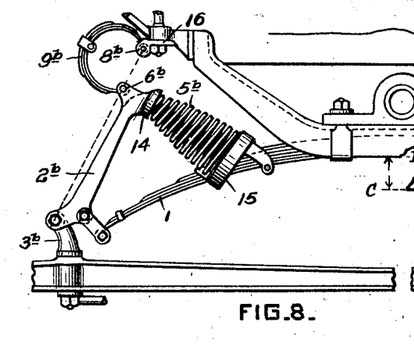
Figs. 8 and 9 are front views of the two sides of a cross-leaf spring provided with another form of my improved supplemental spring suspension, and show the parts thereof in the positions which they assume under normal load (Fig. 8) and under an increased kinetic compression stress (Fig. 9)
Figure 9:
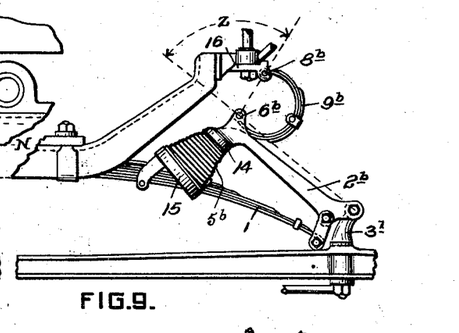

In the construction illustrated in Figs. 8 and 9, the levers $2^b$, $2^b$, are pivotally supported at their outer ends on the reversed axle perches $3^b$, $3^b$, and are shackled at intermediate points in their length to the ends of the main spring 1. The inner end of each lever is provided with a T-shaped head, 14, that engages the upper ends of a pair of twin volute compression springs $5^b$, disposed one on each side of the main spring 1; and the lower extremities of these supplemental coil elements are supported on a saddle bracket 15 that is clipped to the said main spring. The lever elements $2^b$ are also provided with forked ears to receive the cross bolts, $6^b$, that are pivotally engaged with the lower ends of U-shaped leaf spring shackles $9^b$; and the opposing extremities of these resilient shackles are flexibly coupled to the body brackets, 16, 16 by means of the pintle bolts $8^b$, $8^b$.

In the normal or static load position of the parts the initial tensions of the springs $5^b$ maintain the lever elements $2^b$ in such position that the spring terminals $6^b$—$8^b$ are in substantial alignment with the axial supports of the lever elements (see Fig. 8). But when subjected to an increased kinetic load, or compressive shock, the levers $2^b$ are rocked inwardly and downwardly, thereby imposing an added flexural strain on the volute springs $5^b$—$5^b$, and also changing the angular position of the spring shackles $9^b$ with respect to the lever arms to which they are attached. These concurrent angular movements of the elements $2^b$ and $9^b$ will ultimately bring them to the position shown in Fig. 9; and further compression of the system will, in this case, impose an increased flexure on the elastic units $9^b$ as well as on the units $5^b$. The approach of the body and axle parts is thus resisted, and also concurrently controlled or governed—in the manner heretofore explained—by the conjoint and cooperative action of all of the supplemental resilient elements, $5^b$—$5^b$, $9^b$—$9^b$, although the initial tension of the latter springs ($9^b$) is not substantially altered during the major portion of the said movement. But in the reverse rebound movement—above or beyond normal load position—the spring shackle elements $9^b$—$9^b$ are pulled open by an amount that is substantially equal to the said rebound; and the upthrow of the body is therefore directly restrained and checked by the elastic resistance of these curved leaf spring members. In this case the body is maintained in its central, or normal, position on the axle supports, both by the oppositely directed pulls of the connected lever and spring elements $2^b$—$9^b$ (on the conjoined chassis members $3^b$—16), and also by the symmetrically and obliquely inclined thrusts of the tensioned volute coils $5^b$—$5^b$ (against the opposite sides of the main spring 1).

Figures 10, 11:
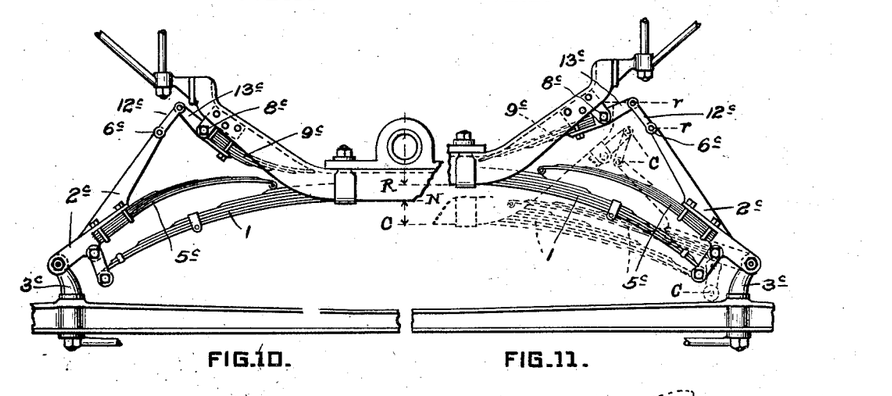
Figs. 10 and 11 are corresponding views of a fourth exemplification of my present improvements, and respectively illustrate the members of the suspension system in their normal load and their rebound positions (and also in the dotted line position of extreme compression)

In the construction shown in Figs. 10 and 11 the relative arrangement of the suspension levers, $2^c$—$2^c$, and of the supplemental springs $5^c$ (with respect to axle and main spring members) is the same as in the last described organization; but the said elements, $5^c$, are in the form of multiple leaf springs, which are bolted at their outer ends to the lever members, $2^c$, and are slidably supported at their inner ends on the upper leaf of the primary spring member 1. The rebound-restraint elements $9^c$—$9^c$ are also made in the form of multiple leaf springs which are bolted to rigid arms $13^c$—$13^c$, that are pivotally mounted on the body bracket cross bolts $8^c$, $8^c$, and are connected to the lever cross bolts $6^c$—$6^c$ by means of the links $12^c$—$12^c$—the various operative parts being so proportioned and arranged that, in the normal load position (Fig. 10), the lines of connection $12^c$—$6^c$, between the spring and lever elements $9^c$—$2^c$ intersect the pivot supports for the said levers. When the system is subjected to an increased kinetic load, or compression stress, the parts are moved from the full line, static load, position of Fig. 10, toward the dotted line positions C—c of Fig. 11. This movement flattens out the supplemental leaf springs, $5^c$—$5^c$, and moves the links, $12^c$—$12^c$, to an inclined position with respect to the lever arms $2^c$—$2^c$, thus subjecting the latter to a tangential component of the initial tension imposed on the bowed leaf springs $9^c$ without sensibly altering that initial tension. When the parts rebound or separate beyond normal load position (Fig. 10) and move toward the positions, R—r, shown in full lines in Fig. 11, the loci of the lever elements, $2^c$—$2^c$ (and the flexural strain on the supplemental resilient elements $5^c$—$5^c$), is not sensibly changed; but the links $12^c$—$12^c$ are subjected to a direct pull which flattens out the leaf springs $9^c$—$9^c$, and thus imposes a progressively increased restraint on the supernormal expansion of the system. In this case the resistance to "rocking," or to relative lateral displacement of the body and axle members, is afforded by the symmetrically and obliquely inclined forces that are transmitted from the tensioned springs $9^c$—$9^c$ through the links $12^c$—$12^c$ to the inwardly and oppositely inclined lever arms $2^c$—$2^c$; and this resistance to side sway becomes progressively greater as the rebound movement increases.

Figures 12, 13:
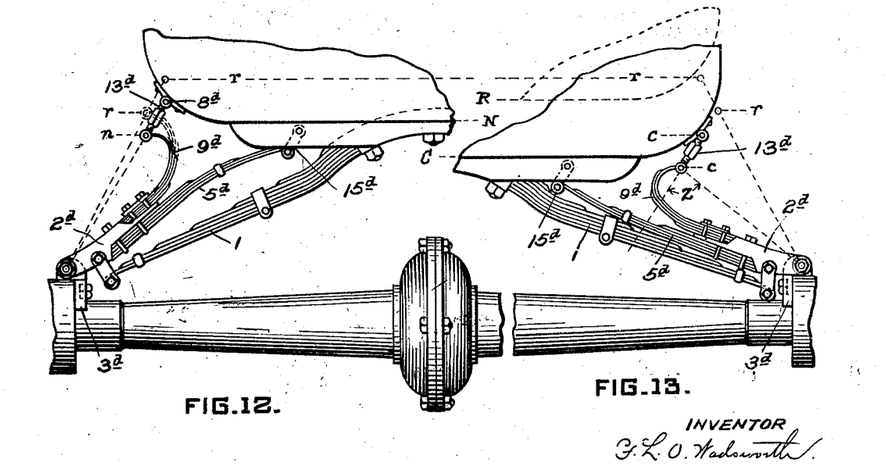
Figs. 12 and 13 are rear end elevations of opposite sides of a cross-leaf spring mounting similar in form to that illustrated in Fig. 6, but with a modified form of supplemental spring elements.

Figs. 12 and 13 depict another supplemental leaf spring suspension which is structurally analogous to that shown in Figs. 8 to 11 inclusive. In the construction now under consideration the lever elements, $2^d$—$2^d$, each carry two multiple leaf springs $5^d$ and $9^d$ which are rigidly bolted thereto, and which are respectively connected, at their inner extremities, to the body of the vehicle by the shackle links, $15^d$ and $13^d$. When the system is subjected to kinetic compression stress the members are moved from the position of static equilibrium (Fig. 12) toward the position C—c shown in full lines in Fig. 13. In this movement the supplemental leaf springs $5^d$ are flattened out; and the link connections $13^d$ are swung through an angle, $z$, thereby subjecting the lever elements $2^d$ to corresponding tangential components of the initial tensions imposed on the secondary springs $9^d$, $9^d$. When the parts are subjected to rebound stress—and move from the full line positions of Fig. 12 toward the dotted line positions R—r of Figs. 12 and 13—the shackle connections $13^d$ exert a direct longitudinal pull on the bowed leaf springs $9^d$ and straighten them out to the form shown at the left of Fig. 12 (dotted lines), thereby imposing a reactive restraint on the separation of the body and axle members. During the first stages of this rebound movement the angular positions of the lever arms $2^d$ (and the corresponding flexures of the supplemental springs $5^d$) are not substantially changed; but when the system is subjected to an excessive expansion, the links 15$^d$ may be brought into substantial alignment with the pivotal supports of the levers, and the secondary leaf spring elements, 5$^d$, may then be subjected to a direct longitudinal pull, that will likewise tend to straighten them out in the manner more fully described in my copending application, Ser. No. 551674, filed April 11th, 1922. Under such circumstances the abnormal separation of the body and axle members will be resisted and checked by the cooperative and conjoint action of both sets of supplemental leaf springs 9$^d$ and 5$^d$; and the side sway of the body on the running gear will also be effectively restrained, or prevented, by the centering action of the oppositely and symmetrically inclined tensions of these longitudinally stretched resilient elements.

Figures 14, 15:
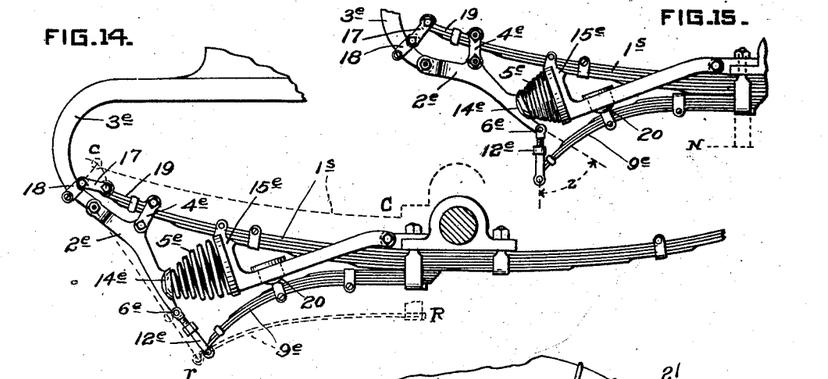
Fig. 14 is an elevation of the rear part of a side leaf spring mounting provided with still another form of my improved shock absorber construction.
Fig. 15 is a similar view of this same structure with the parts thereof in a position of extreme compression.

Figs. 14 and 15 illustrate the application of my invention to a rear side leaf spring support. In this exemplification of my improved shock absorber construction, the outer end of the primary suspension member 1$^s$ is coupled to the scroll body bracket 3$^e$ by means of a radius guide link 17, and a clip 18; and is also shackled to the intermediate part of a lever 2$^e$ by means of the coupling block 19 and the links 4$^e$. The outer extremity of the lever 2$^e$ is forked and pivoted directly on the end of the scroll bracket 3$^e$; and the inner extremity thereof is provided with a head 14$^e$, that engages with the smaller end of a volute compression spring 5$^e$, and is also provided with a cross bolt 6$^e$ that is connected to the eye end of an auxiliary leaf spring 9$^e$ by means of the adjustable link 12$^e$. The larger end of the volute coil 5$^e$ is supported on a forked bracket 15$^e$ that is flexibly carried by the axle block and by an intermediate part of the main spring 1$^s$; and the base of the supplemental leaf spring 9$^e$ is rigidly bolted to the said axle block. The bracket 15$^e$ is also provided with an elastic bumper block 20 that bears on the intermediate portion of the leaf spring 9$^e$ and supplements the elastic resistance of the latter to increased flexure.

The operation of this last described organization is as follows: When the body and axle members are forced toward each other, by a kinetic increase in load stress, the lever 2$^e$ will be rocked in a counter-clockwise direction (toward the position shown in Fig. 15), thus compressing the supplemental spring 5$^e$ against its bracket support 15$^e$, and moving the link 12$^e$, in the opposite direction, through an angle $z$. The resistance to the compression movement will then be the imposed or added tension in the spring 5$^e$ plus that component of the tension in the spring 9$^e$, which acts transversely to the axis of the lever 2$^e$. During this movement, the outer eye end of the main spring 1$^s$ is constrained to follow the arcuate path described by the inner extremity of the radius guide link 17; and this link element is so proportioned and positioned, as to make this arc conform to the natural path traversed by the said eye as the primary suspension member moves toward the body and flattens out under the increased load stress. But when the link 17 has reached the position $c$, (indicated in dotted lines in Fig. 14 and in full lines in Fig. 15), the further relative separation of the parts, 3$^e$—18 and 1$^s$—19, is arrested—with a corresponding suspension of the angular counter-clockwise movement of the lever 2$^e$—and further approach of the body and axle members is thereafter mainly resisted by the flexure of the main spring alone. When the members have returned to normal load position (Fig. 14), the radius link 17 is in substantial alignment with the axle block connection to the main spring 1$^s$; and the link 12$^e$ is also in substantial alignment with the pivot connection between the lever 2$^e$ and the body bracket 3$^e$. When the parts are subjected to rebound stress—which tends to move them toward the dotted line positions R—$r$ of Fig. 14—the pull of the aligned lever and link elements 2$^e$—12$^e$ on the eye end of the supplemental leaf spring 9$^e$ imposes an increased bending strain on the latter; while the pull of the radius link 17 on the eye end of the main spring concurrently imposes a longitudinal strain on this resilient member that tends to stretch and straighten out its inner and longer leaves, and thereby reactively assists the flexed secondary spring 9$^e$ in restraining and quickly checking the expansion or separation of the body and axle parts of the vehicle.

Figure 16:
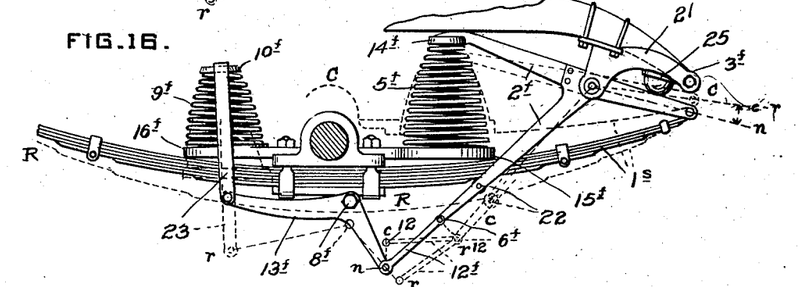
Fig. 16 is another elevation of a further embodiment of my invention as applied, in this case, to a front side leaf spring support.

The construction shown in Fig. 16 is one which is particularly designed for the elastic support of the front axle of a motor vehicle. In this case the front end of an ordinary side leaf spring 1$^s$ is uncoupled from the adjacent extremity of the body horn 3$^f$ and is pinned directly to one vertex of a triangular, or T-shaped, lever member 2$^f$; and the latter is, in turn, pivotally mounted, at its center, on a special bracket 21 that is bolted to the said body horn. The adjacent upper vertex of the lever terminates in a head, 14$^f$, that engages with the upper end of a volute compression spring 5$^f$; and the base of this coil is seated in a recessed head 15$^f$ that is carried by the axle block and the adjacent portion of the attached main spring 1$^s$. The lower vertex of the lever member is provided with a cross bolt 6$^f$ that is connected to one arm of a bell crank arm 13$^f$ by means of the link 12$^f$; and this part of the said lever is further provided with a cross roller 22 that normally bears on the under side of the main leaf spring 1$^s$. The bell crank arm 13$^f$ is pivoted on the axle frame at 8$^f$, and is flexibly coupled to the upper end of a second volute compression spring $9^f$ by means of the stirrup strap 23 and the head $10^f$. The base of the spring $9^f$ is carried on a bracket $16^f$ that is also supported (like the bracket $15^f$) on the axle block and an adjacent portion of the main spring. An elastic buffer block 25 may, if desired, be inserted between one arm of the lever $2^f$ and an adjacent part of the bracket 21, in order to prevent rattle if the bearings become worn, and also to assist the action of the supplemental spring $5^f$ in maintaining the parts in the normal load position that is shown in full lines in Fig. 16.

When the structure illustrated in this figure is subjected to an increased load stress the relative approach of the main spring and body parts, $1^s$ and $3^f$—21, rocks the lever element in a counter-clockwise direction and compresses the supplemental spring $5^f$ between the downwardly moving head $14^f$ and the upwardly lifted bracket $15^f$. The relative angular and linear movements of the parts $2^f$ and $8^f$—$13^f$ swings the link $12^f$ into the position $c^{12}$—$r^{12}$ (dotted lines) and the initial tension of the secondary spring $9^f$ is then brought into play to assist the compressed supplemental spring $5^f$ (and the compressed buffer block 25) in cushioning and restraining the further compression of the system. When the members rebound or separate beyond the normal load position— and move toward the positions shown in the dotted lines R—$r$ of Fig. 16—the engagement of the roller 22 with the under side of the main spring $1^s$ carries the lever $2^f$ to the same position as it occupies when the system is compressed to the position C—$c$. This rebound movement does not result in any substantial compression of the coil $5^f$—because the bracket support therefor moves downward with the main spring—but it does exert a pull on the link connection, $12^f$, that rocks the lever $13^f$ in a counter-clockwise direction on its pivot support $8^f$ (to the dotted lines position $r$—$r$—$r$) and thereby compresses the auxiliary coil $9^f$ against its seat $16^f$. This action—which is supplemented by the concurrent compression of the elastic buffer 25—imposes a progressively increasing restraint on the vertical separation of the body and axle parts (beyond normal load position); and the interconnected members $1^s$—$2^f$ form a longitudinally stiff radius rod system that holds the axle in proper spaced relationship to the body horn and bracket, $3^f$—21, and resists, or prevents, any endwise pitching of the tonneau frame on its running gear supports.

Figures 17, 18, 19:
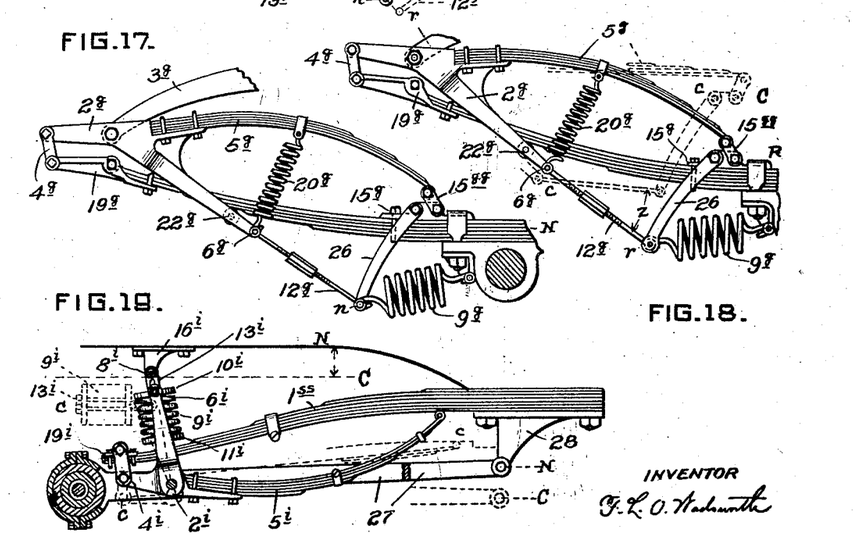
Figs. 17 and 18 are two side views of another exemplification of the present improvements and illustrate respectively the normal load position and the abnormal rebound position of the main and supplemental spring elements of the combination.
Fig. 19 is an elevation of a cantilever spring mounting that is provided with still another modification of my improved supplemental spring suspension.

Figs. 17 and 18 illustrate another application of my improved shock absorber construction to the suspension of either a rear or a front side leaf spring. In the arrangement here shown a T-shaped lever—somewhat similar in form to that depicted in Fig. 16—is pivoted, near its center, on the body bracket or horn $3^g$, and is connected at its outer end with the extremity of the main spring $1^s$, by means of the extension saddle $19^g$ and the shackle links $4^g$. The inner arm of the T head is bolted to the base of the supplemental leaf spring $5^g$, which is shackled at its opposite extremity to the axle bracket $15^g$, by means of the links $15^{gg}$. The central leg of the lever $2^g$ is provided with a cross roller $22^g$ which is normally in engagement with the lower side of the main spring, and is also provided with a cross bolt $6^g$ that is coupled to the outer end of a powerful tension spring $9^g$ by means of the adjustable link $12^g$. The conjoined extremities of the spring $9^g$ and the link $12^g$ are supported and guided by the swinging arm 26 which is pivoted on the bracket $15^g$; and the inner end of the auxiliary coil spring is flexibly secured to the axle block assembly. A second coil spring $20^g$ is flexibly secured at its opposite extremities to the cross bolt $6^g$ and to the intermediate part of the supplemental leaf spring $5^g$ and serves to reinforce the latter against increased flexural strain.

When the body and axle members $3^g$ and $15^g$ are forced toward each other, by a kinetic compression shock, the lever $2^g$ is rocked in a clockwise direction; the supplemental leaf spring $5^g$ is flattened out; and the coil spring $20^g$ is elongated; as shown by the dotted lines $c$—$c$—C of Fig. 18. This movement does not sensibly alter the normal tension of the spring $9^g$, but it rocks the link $12^g$ through an angle $z$ and thereby subjects the lever $2^g$ to a tangential component of this normal tension; and any further approach of the spring supported parts will then subject the tension coil $9^g$ to augmented flexure, which thus cooperates with the increased strain in the resilient elements $5^g$ and $20^g$ in resisting and checking the compression of the system. On rebound movement the separation of the body and axle parts exerts a longitudinal pull on the aligned lever and link elements $2^g$—$12^g$, which swings the guide lever 26 toward the left and elongates the heavy tension spring $9^g$. In this case also the pressure of the main spring $1^s$ on the roller $22^g$ will tend to move the lever $2^g$ in the same direction in which it is rocked by the compression of the system; and this movement will tend to further elongate the rebound-restraint element $9^g$, and thus quickly arrest the abnormal expansion of the spring supported parts.

Fig. 19 illustrates the application of another form of my improvements to a main cantilever spring suspension for the rear axle of a motor vehicle. In this embodiment of my invention the end of the main spring $1^{ss}$ is coupled to the outer extremity of a lever $2^l$ by means of the saddle $19^l$ and the shackle links $4^i$. This lever is pivotally supported, at an intermediate point in its length, between the forks of a radius rod member 27, that connects the rear axle with a bracket 28 on the body frame; and it is rigidly bolted at its inner end to the base of a supplemental leaf spring $5^i$ that is slidably engaged with the underside of the main spring $1^{ss}$. The lever member $2^i$ is also provided with upwardly extending arms which carry a trunnion bolt $6^i$ that is attached to a head $10^i$; and this head is centrally perforated to receive a U bolt $13^i$, which is pivoted at its upper end on the body bracket $16^i$ (by means of the cross bolt $8^i$) and is adjustably secured at its lower end to the follower plate $11^i$. A strong compression spring $9^i$ is confined, at suitable initial tension, between the head $10^i$ and the plate $11^i$. When the body moves toward the axle (from the full line normal load position N toward the dotted line position C—c—c) the lever $2^i$ is rocked in a counter-clockwise direction on the radius arm support, and the supplemental leaf spring $5^i$ is flattened out against the under side of the downwardly moving main spring $1^{ss}$. The downward movement of the body bracket $16^i$, and the concurrent angular movement of the lever $2^i$, also swings the parts $9^i$—$10^i$—$11^i$ and $13^i$ into the dotted line position shown at the left of Fig. 19; and the supplemental coil spring $9^i$ then exerts a tangential or transverse thrust on the upwardly extending lever arms, thereby assisting the action of the flexed leaf spring $5^i$ in restraining and checking the further compression of the system. When the parts return to normal load position the axis of the initially compressed coil spring $9^i$ is substantially in line with the main pivot support of the lever $2^i$; and any rebound, or further separation, of the spring connected members is then directly resisted and quickly arrested by the correspondingly increased compression of this secondary resilient element, without imposing any strain on either the supplemental leaf spring $5^i$ or the main cantilever spring $1^{ss}$.

All of the constructions heretofore considered comprise, or include, lever elements that are interposed between the main resilient members of the suspension systems and those supplemental elements thereof which are particularly provided to resist compression movements; the purpose of such interposed connections being, in general, to multiply or magnify the effect of the linear approach of the body and axle parts. But my invention is also generically applicable to the direct suspension type of shock absorber construction, in which a part or portion of the main spring is directly carried on a supplemental cushioning spring whose flexural movements are, therefore, the same in amount as those of the main spring part to which it is attached. The fourth sheet of my drawings illustrate three forms of such construction, in which the lever element of the combination plays no part in determining or influencing the primary and direct action of the supplemental suspension spring (in cushioning and absorbing the effects of compressive shock), but serves only as a means for controlling the secondary effect of the rebound-resisting spring (in supplementing the action of the first mentioned spring), and for conjoining the said elastic rebound check element with the relatively movable members of the chassis frame.

Figure 20:
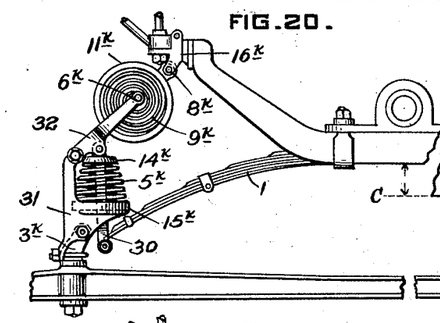
Figs. 20–21 and 22–23 illustrate two forms of my present invention as adapted to the direct suspension type of supplemental spring supports (the S. S. S. type) for either cross-leaf or side-leaf main springs, showing respectively the static load position of the parts (Figs. 20 and 22) and the kinetically loaded positions thereof.
Figure 21:
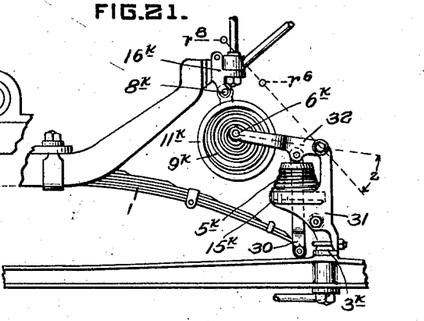

In the organization shown in Figs. 20 and 21, the ends of the main spring 1 are directly coupled to the forked extremities of link arms 30—30 which pass through the slotted feet of L-shaped brackets 31 that are bolted rigidly to the axle perches $3^k$. The upper ends of these links terminate in heads $14^k$ that engage with the adjacent extremities of the supplemental suspension springs $5^k$; and the lower extremities of these springs are carried by the recessed feet $15^k$ of the brackets 31. The heads $14^k$ are pivotally connected to intermediate points of the levers 32, which are rockably supported on the vertical legs of the brackets 31, and which serve as radius guide links for the said heads. These levers are forked at their inner ends, and are there provided with cross bolts $6^k$ which engage with the central eyes of eccentrically coiled spiral springs $9^k$; and the latter are mounted in rings $11^k$ that are flexibly supported on the body brackets $16^k$ by the bolts $8^k$.

When the body and axle members are forced toward each other by a kinetic increase in load (i. e., a compressive shock), the parts of the suspension system move from the full line positions of Fig. 20 toward those of Fig. 21. In this movement the supplemental suspension springs $5^k$ are directly compressed—by an amount equal to the relative movement between the axle and the ends of the main spring member 1—and the levers 32 are rocked inwardly through an angle, $z$, thus bringing the initial tensions in the eccentric coil springs $9^k$ into play to aid in resisting the approach of the body and axle parts. When the system has recoiled to normal load position the transverse compression axes of the spiral elements $9^k$ are in substantial alignment with the axes of the levers 32; and any rebound (i. e., any further separation of the body and axle members), is then directly resisted and quickly checked by the increased transverse flexure of the spiral coils, without sensibly altering the normal compression of the suspension springs $5^k$. The longitudinal tensions in the oppositely and symmetrically inclined connections (32—$6^k$—$9^k$—$8^k$) between the axle and body brackets ($3^k$—31 and $16^k$), also holds the tonneau of the vehicle in a balanced and centered position on its running gear supports and restrains, or prevents, side sway and rolling of the vehicle body.

Figure 22:
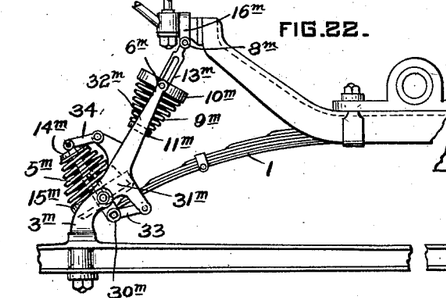
Figure 23:
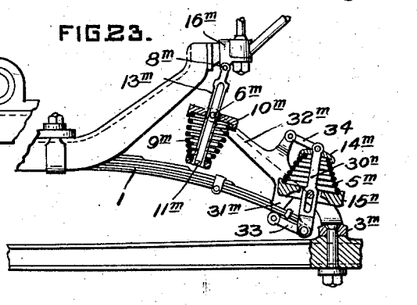
Figure 24:
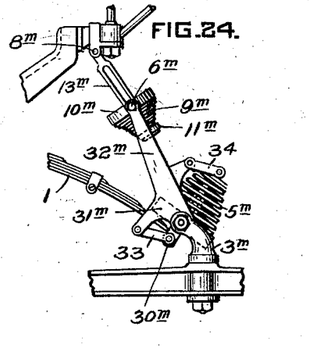
Fig. 24 is another view of the construction illustrated in Fig. 23 and shows the members of that construction in the position of extreme rebound.

In the form of organization shown in Figs. 22—23 and 24, the ends of the main spring are pinned, as before, to the lower forked extremities of connecting rods $30^m$ which are adapted to slide longitudinally through the heads $15^m$ of bracket frames $31^m$, and which are guided in their longitudinal movement by "parallel motion" radius links 33—34 that connect the extremities of the said rods with the said frames. The frames $31^m$ are in this case pivotally supported on the axle perches $3^m$, and are provided with forked extensions $32^m$ that are adapted to carry the trunnions $6^m$ of recessed heads $10^m$. The heads $10^m$ are apertured to slidably receive the legs of U bolts $13^m$ that are pivotally supported, at their upper ends on the cross bolts $8^m$ of the body brackets $16^m$, and are secured at their lower ends to the heads $11^m$. A pair of volute suspension springs $5^m$ are interposed between the upper caps, $14^m$, of the rods $30^m$ and the heads $15^m$ of the rocking frames $31^m$; and a second pair of similar springs $9^m$ are confined, at a suitable initial tension, between the heads $10^m$ and $11^m$. When the main spring and body members are forced toward the axle the supplemental suspension springs $5^m$ are further compressed; and the concurrent increased bending and flattening of the main spring 1 rocks the pivoted frames $31^m$ inwardly toward the position shown in full lines in Fig. 23. This rocking movement swings the U bolt frames $13^m$—and the secondary coil springs $9^m$ associated therewith —into an oblique position with respect to the arms $32^m$ of the frames $31^m$; and the initially tensioned elements $9^m$ then exert an outward thrust on the heads $10^m$ that serve to supplement the increased flexure of the suspension springs $5^m$ in cushioning and absorbing compressive shocks. When the parts have returned to normal load position the axes of the secondary coils $9^m$ are in substantial alignment with the pivot supports of the frames $31^m$—$32^m$; and any rebound or expansion of the system carries the members toward the full line position of Fig. 24. This movement imposes correspondingly increased flexures on the secondary springs $9^m$, and the abnormal separation of the body and axle parts—as well as any lateral displacement or relative side sway of these parts—is thus strongly resisted and quickly checked.

Figure 25:
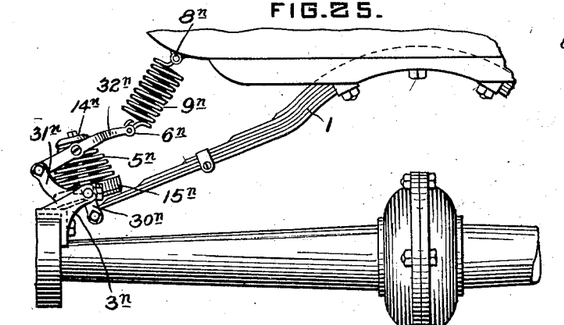
Fig. 25 illustrates a third exemplification of my improvements as applied to the direct suspension type of organization.
Figure 26:
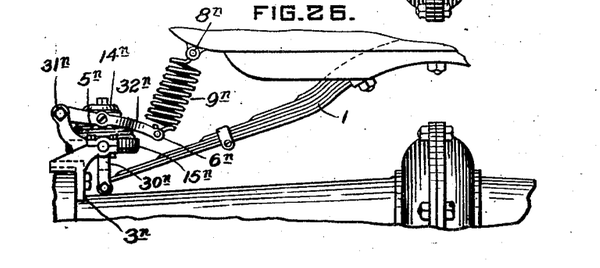
Fig. 26 is a view of this last construction with the parts in the position which they assume under an increased load stress.

The construction shown in Figs. 25 and 26—which is particularly designed for the rear axle suspension of a Ford car—is structurally analogous to that shown in Figs. 20 and 21. In this illustrative embodiment of my improvements each end of the main cross leaf spring 1 is directly connected to the lower forked extremity of a sliding link bar $30^n$, which passes through a slot in the base $15^n$, of the frame $31^n$, and terminates, at its upper end, in a cap $14^n$ that is embraced between, and pivoted to, the twin arms of a forked lever $32^n$, whose outer extremity is also supported on the frame $31^n$. The inner ends of the lever arms ($32^n$) carry a cross bolt $6^n$; and this cross bolt is elastically coupled to a body bolt, or bracket, $8^n$, by means of the open coil tension spring $9^n$. The frame $31^n$ is, in this case, pivotally supported on the brake drum bracket $3^n$; and a direct suspension spring $5^n$ is interposed between the cap $14^n$ of the link bar $30^n$ and the base $15^n$ of the swinging frame. When the body and axle members move toward each other—from the normal load position of Fig. 25 toward the position shown in Fig. 26—the suspension coils $5^n$, at the opposite ends of the main spring, are subjected to augmented compression, and the concurrent increased flexure and flattening of the main spring rocks the support frames $31^n$ inwardly. The combined downward movements of the heads $14^n$ and the inward angular movements of the frames $31^n$ carry the cross bolt connections $6^n$ to such positions with respect to the connections $8^n$ that the initial tensions of the coil springs $9^n$ also become effective in resisting the approach of the body and axle members. When the parts have returned to normal load position (Fig. 25) the forked extremity of the link bar $30^n$ engages with the base of the frame $31^n$ (thus preventing any further expansion of the suspension springs $5^n$) and the axis of the tension coil $9^n$ is then in substantial alignment with the pivot support of the said frame on the bracket $3^n$. Under such circumstances any rebound movement is directly resisted by the increased flexural strain thereby imposed on the springs $9^n$; and the symmetrically and obliquely directed pulls of these stretched resilient elements, on the opposite sides of the vehicle body, is also effective in restraining or preventing any lateral displacement of the vertically oscillating chassis members.

The foregoing description of various illustrative embodiments of my present invention will enable those skilled in this art to recognize and appreciate the basic and characteristic features that are possessed in common by the aforesaid exemplifications; and to also apprehend and apply the principles of construction and operation herein set forth in the production of various other forms of resilient suspension systems that may, as desired, present all, or only a part, of these characteristic features. The several specific embodiments that I have depicted and described as generically representative of my improved dual restraint suspension system, also present certain individual features of structure or functional action that may be most advantageously utilized in conjunction with certain forms of main spring supports; and with the foregoing disclosure as a guide, those who are familiar with organizations of this character, can, in any particular case, readily determine and apply that specific exemplification of my improvements that is best adapted to meet the particular conditions involved. For these reasons I do not wish to be understood as restricting myself to any of the hereinbefore disclosed constructions as presenting a preferred form of my invention; or as limiting myself in the scope and application thereof except as may be indicated in the appended claims.

I claim:

1. In an elastic suspension system for vehicles the combination of a rocking member, a plurality of springs operatively connected thereto, and means for effecting a substantial change in the angular position of the said member with respect to the flexural axis of one of said springs without substantially altering the initial tension of the latter, substantially as described and for the purpose specified.

2. In an elastic suspension system for the relatively movable parts of a vehicle chassis, the combination of a plurality of springs, a rocking member operatively connected with one of said springs and with one of the said relatively movable parts, and a system of connections conjoining another of the said springs to the said member and to the other of said parts, whereby the angular relationship of the rocking member and the last mentioned spring is progressively changed without substantially altering the initial tension of this spring when the chassis parts move from normal load position toward each other.

3. In an elastic suspension system of two relatively movable parts, the combination, of a rocking member pivotally mounted on one of said parts and operatively connected to the other part, a spring attached at one end to the said member and adapted to be progressively flexed when the member is rocked on its pivotal support, and a second spring conjoining the rocking member and one of said movable parts and adapted to be progressively flexed without any substantial movement of said member when the parts separate beyond normal position.

4. In a spring suspension system for vehicles the combination of a spring, a lever element pivotally mounted on one of the relatively movable members of the vehicle and operatively connected to the said spring, means for rocking said lever element on its pivotal mounting and concurrently flexing the said spring when the vehicle members approach one another, a second spring conjoining the lever element with one of the vehicle members and acting to directly resist the separation of said members beyond normal load position.

5. In a suspension system for vehicles the combination of a main spring, a plurality of supplemental springs all cooperating therewith to resist and control the compression movement of the system, and means for imposing an increased flexure on one of said springs without substantially altering the normal or initial tension of the others when the system expands beyond normal load position.

6. In an elastic suspension system for two relatively movable members the combination of a plurality of springs, means for operatively connecting said springs with said members, means for increasing the normal or initial tension of one of said springs and for concurrently altering the angular position of another of said springs without substantially changing its initial tension when the movable members are forced toward each other, and means for increasing the initial tension of the last mentioned spring without substantially altering its position when the members are separated beyond normal load position.

7. In an elastic suspension system for vehicles the combination of a main spring, a plurality of supplemental springs cooperating therewith, means for changing the angular position of one of said springs without substantially altering the initial flexure thereof when the system is subjected to compression, and for changing the initial flexure of this same spring without substantially altering its angular position when the system is subjected to rebound stress.

8. An elastic shock absorbing device for vehicles which comprises a plurality of spring elements, means for separately connecting each of said elements to the body or to the axle members of the vehicle, means for altering the angular relationship of certain of these springs with respect to its associated vehicle members when the parts are displaced in one direction from normal load position and for progressively increasing the initial flexure of these same springs without substantially altering the angular position thereof when the vehicle parts are displaced in the other direction from normal position.

9. An elastic suspension system for vehicles which comprises the combination of a main spring, a supplemental spring, means for increasing the initial tension of said spring when the system is kinetically compressed, a second supplemental spring, and means for altering the angular position of this second spring without substantially changing its initial tension when the system is compressed, and for increasing its initial tension without substantially altering its angular position when the system is expanded beyond normal load position.

10. In an elastic suspension system for vehicles the combination of a compression resisting spring for restraining relative vertical movements of the body and axle members toward each other, a rebound check spring for resisting a vertical separation of the said members beyond normal load position, and means for shifting the line of action of the said rebound-check spring during approach movements and thereby imposing an increased restraint on relative lateral displacements of the moving members.

11. In an elastic suspension system for vehicles the combination of a plurality of springs interposed between the relatively movable body and axle members thereof, with means for increasing the flexure of one set of springs to thereby restrain relative vertical movements of the said members in one direction and for concurrently shifting the line of flexural action of other springs to thereby restrain relative lateral displacements of the said vertically moving members.

12. An elastic suspension system for vehicles which comprises a compression resisting spring, a rebound check spring, a lever operatively connected with both of the said springs, and means for changing the angular position of the lever to increase the flexure of the compression resisting spring and to concurrently alter the position of the rebound check spring, and thereby augment the control of the system on both vertical and lateral oscillations of the relatively movable vehicle members.

13. In an elastic suspension system for two relatively movable members the combination of a lever pivotally supported on one of the said members, a spring flexibly mounted on the second of the said members and connected to the said lever with the line of connection normally intersecting the pivotal support therefor, a second spring interposed between the said lever and one of said members with its line of flexure inclined at a large angle to the longitudinal axis of the said lever, and means conjoining the said second member with the lever and acting to rock the latter and to concurrently increase the flexure of the said second spring when the members are moved from the position of static equilibrium toward each other.

14. A shock absorber organization for vehicles which comprises a lever pivotally supported on one of the vehicle members, a supplemental compression resisting spring connected to the said lever with its axis of flexure inclined at a large angle thereto, a coupling element conjoining the lever-supplemental-spring-assemblage with another of the vehicle members and acting to impose an increased flexure on the said spring when the organization is subjected to an increased load stress, and an auxiliary rebound check spring interposed between the last mentioned vehicle member and the said lever with its axis of flexure normally intersecting the pivotal support therefor and acting to directly oppose any separation of the said members beyond normal load position.

15. A spring suspension system for vehicles which comprises a main spring, a supplemental spring cooperating in series therewith to resist the approach of the relatively movable chassis members, a lever element pivotally supported on one of the said members, an auxiliary rebound check spring flexibly attached to another of the said members and connected to the said lever with the line of connection normally intersecting the pivotal support therefor whereby the said auxiliary spring may be maintained under a predetermined normal flexure without exerting any rotative stress on the said lever, and means for rocking the lever on its pivotal support when the main and supplemental spring elements are cooperatively flexed by approach movements and thereby altering the relative positions of said lever and said rebound-check spring without substantially changing the normal flexure of the latter.

16. In a suspension system for two relatively movable members the combination of a main spring rigidly supported on one of said members, a lever pivotally supported on the other member and flexibly coupled to one end of the said main spring, a supplemental spring operatively associated with the said lever and acting in series with said main spring to resist and check compression movements of the system, an auxiliary spring conjoining the main spring supporting member and the said lever with its axis of flexural strain normally intersecting the pivotal support of the lever and acting to directly resist any rebound or separation of the said members beyond their position of static equilibrium.

17. In a spring suspension system for vehicles the combination of a main spring rigidly supported on one of the chassis members thereof, a lever element pivotally mounted on another of the said members and flexibly coupled to one end of the said main spring, a supplemental compression resisting spring interposed between the said lever and an intermediate flexible part of the said main spring, and an auxiliary rebond-check spring conjoining the main spring supporting member and the lever element with its line of flexural action normally intersecting the pivot support of the lever and so positioned with respect thereto that the relative motion of the conjoined parts during compressive movements does not substantially alter the normal initial flexure of the said rebound-check spring.

18. A shock absorber organization for the relatively movable chassis members of a vehicle which comprises a lever element pivotally mounted on one of the said members, a coupling element conjoining said lever with a second relatively movable chassis member and acting to rock the lever on its pivotal support when the said members are moved from normal load position toward each other, a supplemental compression resisting spring operatively connected with the said lever and adapted to resist the rocking movement thereof, and a rebound check spring connecting the said lever and the said second chassis member, the said rebound check spring being so positioned with respect to its connections that it is normally maintained under a substantially constant initial flexure when the lever is rocked on its pivotal support during compression movements and is subjected to a progressively increased flexure when the connected parts are separated by a rebound movement beyond the normal load position.

19. In a spring suspension system for two relatively movable members the combination of a lever element pivotally supported on one of the said members, means for rocking the said element on its pivotal support when the two members are moved from the position of static equilibrium toward each other, a spring having its flexural axis inclined to the line of said movement and adapted to resist the rocking of the said lever, a second spring flexibly connecting the other of the said members with the said lever and so positioned with respect thereto that the line of connection normally intersects the pivotal support for the said lever and is progressively inclined to the axis thereof as the said members approach each other.

20. A shock absorber organization for two relatively movable members which comprises a spring having its flexural axis inclined to the line of movement therebetween, a lever pivotally mounted on one of the said members and operatively conjoined with the said spring, a second spring connecting the said lever and the other of the said members with the line connection normally intersecting the pivotal support of the lever, and means for progressively shifting the said line of connection relative to the said line of movement when the members approach each other and for maintaining it in substantially fixed relationship thereto when the members are separated beyond the position of static equilibrium.

21. In a spring suspension system for two relatively movable members the combination of a pair of levers pivotally mounted on one member and symmetrically positioned with respect to the other, means for concurrently moving the said levers in opposite directions when the said members approach each other, a pair of spring units having their flexural axes symmetrically inclined with respect to the line of movement between the said members and adapted to be progressively flexed by the movement of the said levers, and a second pair of spring units connecting the levers and the second of the said members with the said lines of connection normally intersecting the pivotal supports for the said levers, both sets of said springs being adapted to continually restrain any sidewise displacement of the said members with respect to each other.

In testimony whereof I have hereunto set my hand.

FRANK L. O. WADSWORTH.